United States Patent
Gresham

[11] 3,734,687
[45] May 22, 1973

[54] FABRIC FINISHED WITH A FLUORINATED QUATERNIZED HALOMETHYL ETHER

[75] Inventor: John Thomas Gresham, Skillman, N.J.

[73] Assignee: FMC Corporation, New York, N.Y.

[22] Filed: Apr. 5, 1971

[21] Appl. No.: 131,451

Related U.S. Application Data

[62] Division of Ser. No. 813,725, April 4, 1969, Pat. No. 3,622,590.

[52] U.S. Cl. .................... 8/188, 8/115.5, 8/128, 117/140 R, 117/141, 117/142, 117/143 R, 117/154
[51] Int. Cl. ........................... D06m 13/34
[58] Field of Search ............... 117/141, 142, 143 R, 117/144, 147, 154, 121; 8/116.2, 115.5, 128

[56] References Cited

UNITED STATES PATENTS

| | | | |
|---|---|---|---|
| 3,147,065 | 9/1964 | Koshar et al. | 117/121 X |
| 3,147,064 | 9/1964 | Brown et al. | 117/121 X |
| 3,171,861 | 3/1965 | Ahlbrecht | 260/297 |

*Primary Examiner*—William D. Martin
*Assistant Examiner*—Theodore G. Davis
*Attorney*—Milton Zucker, Eugene G. Seems and Robert D. Jackson

[57] ABSTRACT

Fluorinated halomethyl ethers and the quaternary salts thereof, which are useful as stain repellents, have the formulas:

$R_f(CH_2)_n(OR)_mOCH_2X$ and $[R_f(CH_2)_n(OR)_mOCH_2A]^+X^-$ wherein $R_f$ is perfluoroalkyl of four to 16 carbon atoms, R is alkylene of two to three carbon atoms, X is halogen of the group chlorine or bromine, A is the residue of a tertiary nitrogenous base, $n$ is an integer of 1–12 and $m$ is an integer of 1–4. The quaternized compounds are employed for treating textile material such as cotton fabric.

1 Claim, No Drawings

A FABRIC FINISHED WITH A FLUORINATED QUARTERNIZED HALOMETHYL ETHER

CROSS REFERENCE TO RELATED APPLICATIONS

This application is a division of Ser. No. 813,725, filed Apr. 4, 1969 now U.S. Pat. No. 3,622,590.

BACKGROUND OF THE INVENTION

A. Field of the Invention

This invention relates to fiber reactive materials. It is particularly concerned with fiber reactive quaternary salts of fluorinated halomethyl ethers and to textiles treated therewith.

B. Description of the Prior Art

It is known that the soil resistance and oil and water repellency of textiles are improved by treating them with certain fiber reactive stain repellents. A class of compounds which has been found to exhibit fiber reactive properties are the quaternized halomethyl ethers, $$[R\ CH_2Z]^+X'$$

where R is an organic residue; Z is the radical of a tertiary nitrogenous base and X' is halogen, commonly chlorine. Although numerous structural modifications of quaternized halomethyl ethers have been tested, those containing a substantial degree of fluorine substitution are believed to be especially promising for rendering textiles soil resistant as well as oil and water repellent. Manifestly, therefore, the art stands to benefit from the introduction of new and improved members belonging to this class of fiber reactive materials.

SUMMARY OF THE INVENTION

I have now discovered a class of fluorinated quaternized halomethyl ethers which impart excellent soil resistance and oil and water repellency to textile substrates. These compounds, and their halomethyl ether precursors are characterized by the following formulas, $$R_f(CH_2)_n(OR)_mOCH_2X \text{ and } [R_f(CH_2)_n(OR)_mOCH_2A]^+X^-$$

wherein $R_f$ is perfluoroalkyl of four to 16 carbon atoms, R is alkylene of two to three carbon atoms, X is chlorine or bromine, A is the residue of a tertiary nitrogenous base, n is an integer of 1–12 and m is an integer of 1–4.

DESCRIPTION OF THE INVENTION AND THE PREFERRED EMBODIMENTS

The compounds of the invention are prepared by the reaction of formaldehyde and hydrogen halide, e.g., hydrogen bromide or hydrogen chloride, with the corresponding fluorinated ether-alcohol to form a halomethyl ether, which is reacted with a tertiary amine to form a quaternary ammonium salt. The reaction proceeds to completion in a few minutes. Heating is not necessary.

An alternate procedure consists in reacting the requisite fluorinated ether-alcohol and paraformaldehyde with a hydrohalide of a tertiary amine, e.g., pyridine or a trialkylamine, in a suitable solvent such as the amine itself.

The fluorinated ether-alcohols, which are the precursor materials for the compounds of the invention, are available according to the procedures and description set forth in my copending application, Ser. No. 751,364, filed Aug. 9, 1968 now abandoned. These compounds, where the number (n) of $CH_2$ units in a chain are two or less, are obtained by reacting fluorinated alcohols of the formula $R_f(CH_2)_{1-2}OH$, where $R_f$ represents a perfluoroalkyl radical of four to 16 carbon atoms, with the requisite number of moles of ethylene oxide in the usual manner of carrying out ethylene oxide/alcohol condensations. Generally the ethylene oxide is introduced into the particular alcohol in the presence of a basic condensing agent, such as sodium hydroxide. Elevated temperatures in the neighborhood of 100° C. are commonly employed. For a fuller description of the reaction of fluorinated lower alcohols with ethylene oxide, reference is made to U.S. Pat. No. 2,723,999. The fluorinated alcohols are described in U.S. Pat. Nos. 2,666,797 and 3,171,861.

Where the number (n) of $(CH_2)$ units in the fluorinated ether-alcohol exceeds two, these are realized by a general synthetic process wherein a perfluoroalkyl iodide is reacted with an ethylenically unsaturated alcohol under free-radical generating conditions and the resulting iodo ether-alcohol is then treated with hydrogen and a metal catalyst in the presence of a base to give the desired ether-alcohol. The reaction steps are given by the following equations:

$$R_fI + CH_2=CH-(CH_2)_{1-10}O(RO)_{1-4}H$$

$$I \quad R_fCH_2CHI(CH_2)_{1-10}O(RO)_{1-4}H \xrightarrow{\text{free radical initiation}}$$

$$II \quad R_f(CH_2)_{1-12}O(RO)_{1-4}H \xrightarrow{\text{hydrogen; metal catalyst; base}}$$

Compounds of the type represented by formula I are obtained by heating essentially stoichiometric amounts of a perfluoroalkyl iodide with the ethylenically unsaturated alcohol under free radical generating conditions. The reaction tends to become exothermic and may require external cooling. When the temperature drops, the reaction is completed by the application of external heat.

Although a solvent can be used, normally it is not required. The reactants function as effective solvents and provide for a greater concentration of reacting molecules. The free radical generating conditions can be achieved by known means, and it is convenient to employ a free radical producing catalyst such as azobis(isobutyronitrile). Approximately 0.01 mole of catalyst is used per mole of either reactant.

The compounds represented by formula II are obtained by the reductive removal of iodine from the adducts of formula I. Generally satisfactory results are achieved by conducting the reaction under basic conditions in the presence of a normally liquid, relatively inert organic solvent, the normally liquid, saturated lower aliphatic alcohols being particularly suitable. Ethyl alcohol is an excellent choice since it is capable of dissolving the adducts.

The base is preferably one that is an alkali metal carbonate or alkaline earth metal carbonate, such as sodium carbonate, potassium carbonate, calcium carbonate and other bases having about the same degree of alkalinity. It is important that the base be of limited solubility in the reaction medium since otherwise dehydrofluorination may occur, thereby leading to the formation of undesirable by-products.

The catalyst may be any of those commonly employed in reductive dehalogenation, as exemplified by Raney nickel, palladium, platinum, etc.

Illustrative fluorinated ether-alcohols suitable for use with the invention include the following:

C₄F₉CH₂CH₂OCH₂CH₂OH
C₄F₉CH₂CH₂O(CH₂CH₂O)₄H
C₅F₁₁CH₂CH₂CH₂OCH₂CH₂OH
C₅F₁₁CH₂CH₂CH₂O(CH₂CH₂O)₃H
C₈F₁₇(CH₂)₁₁OCH₂CH₂CH₂OH
C₈F₁₇(CH₂)₁₁O(CH₂CH₂O)₄H
C₁₀F₂₁(CH₂)₅OCH₂CH₂OH
C₁₂F₂₅CH₂OCH₂CH₂OH
C₁₆F₃₃CH₂OCH₂CH₂CH₂OH

Exemplary quaternized halomethylethers of the invention include the following:

[C₄F₉CH₂OCH₂CH₂OCH₂N(CH₃)₃]⁺Cl⁻

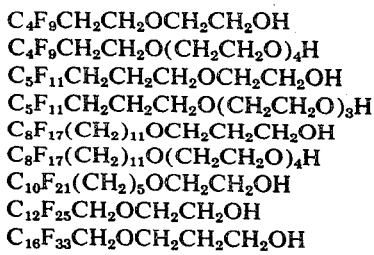

[C₆F₁₃(CH₂)₁₀OCH₂CH₂OCH₂N(C₂H₅)₃]⁺Br⁻

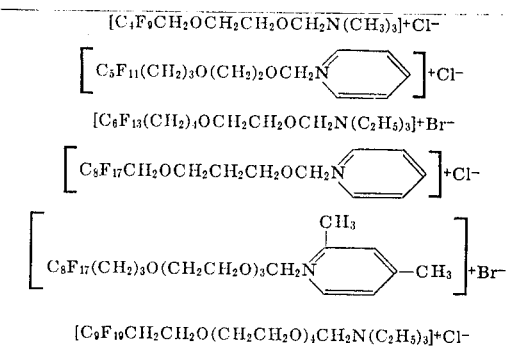

[C₉F₁₉CH₂CH₂O(CH₂CH₂O)₄CH₂N(C₂H₅)₃]⁺Cl⁻

Any tertiary amine which is capable of forming a salt or quaternary compound is suitable for reacting with the halomethyl ethers herein to produce the fiber reactive quaternary ammonium salts of the invention. Typical tertiary amines are trialkyl amines such as trimethylamine, triethylamine, tri-n-butylamine, tridodecylamine and the like; cycloalkyl amines such as tricyclohexylamine and the like; arylalkyl amines such as benzyldimethylamine, benzyldiethylamine, dibenzylethylamine, and the like; aryl amines, such as N,N-dimethylaniline, N,N-diethylaniline, N-methyl-N-ethylaniline, N,N-diisopropylaniline and the like; as well as the heterocyclic amines such as pyridine, picoline, lutidine, quinoline, quinaldine, lepidine, N-ethylpyrrolidine, N-methyltetrahydroquinoline and the like. Pyridine is especially convenient and economical as an intermediate in forming the fiber reactive quaternary salts of the invention.

The quaternized compounds of the invention are employed for treating woven or non-woven fibrous materials including wool, cotton, rayon, acetate, and the like textiles, or paper, leather, wood, felt and similar organic fibrous substrates, and particularly cellulosic materials, by applying the selected quaternary ammonium derivatives, in aqueous medium buffered to about pH 6, to the cloth, removing any excess, drying at a temperature in the range of about 40° to 100° C., and heating the dried material to about 100° to 150° C. for a period of the order of about 1 to 30 minutes to fix the finish. Thereafter the material is desirably washed in a mildly alkaline aqueous solution to remove any residual acidic material, and dried. This treatment may be omitted since subsequent laundering of the treated fabric accomplishes the same purpose. Cotton cloth so treated contains fluorine. The fluorine content diminishes only slightly after several launderings, indicating that the quaternary has reacted with cellulose.

It is a surprising feature of cotton fabric treated with these quaternary derivatives that not only is the cloth rendered oil- and water-repellent, but it does not become soiled as readily as untreated fabric. Furthermore, when soiled, the fabrics thus treated are readily launderable or dry-cleaned to a clean state, after which they retain their oil- and water-repellency. The value of cloth so treated, for example, for children's clothes, or for uniforms for workers around oily machinery, automotive service men and the like will be readily apparent.

The color of the fabrics treated with the compositions of the invention, and their tensile strength, are not affected by the treatment. The hand of cotton fabrics even appears to be improved by the treatment.

It is noted that the finishing treatment of the invention can be applied to resin-treated, wrinkle-resistant fabrics without adversely affecting the desirable non-wrinkling feature of such fabrics.

The procedure for the preparation of the quaternized compounds of the invention, and the application of the latter to fabrics, especially cellulosic materials are more specifically illustrated in the following examples. It will be understood that these examples are illustrative only to show the best mode presently contemplated of practicing the invention and are not to be construed as limiting as to the scope of the invention. Reference is now made to the following examples:

EXAMPLE 1

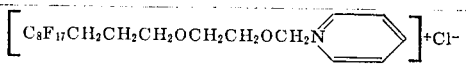

A 100 ml. flask is equipped with a magnetic stirrer, reflux condenser, fritted glass gas inlet tube, and thermometer. To the flask are added heptadecafluoroundecyloxyethanol (13.0 g., 0.025 mole), 91 percent paraformaldehyde (1.3 g. 0.04 mole), and benzene (40 ml). The immiscible benzene and fluoroalcohol layers are stirred and cooled to 10° C. in an ice bath and hydrogen chloride is bubbled in. A slight rise in temperature is noted. After several minutes the fluoroalcohol dissolves and hydrogen chloride is no longer absorbed. The stirring is stopped and nitrogen bubbled through the solution to remove excess hydrogen chloride. The solvent is filtered to remove a small amount of unreacted paraformaldehyde and the solvent evaporated at reduced pressure leaving 13.9 g. of colorless oil. The oil is dissolved in 50 ml. of dry ether and 3 g. of pyridine added. The solution becomes turbid and precipitation begins. The precipitate which forms on standing overnight in the refrigerator is filtered, washed with ether, and dried overnight in a vacuum desiccator. The yield is 10.2 g. of a white powder. Analysis: Calc'd for $C_{19}F_{17}H_{17}NO_2Cl$: Cl⁻, 5.46; F, 49.71. Found: Cl⁻, 5.51; F, 49.79.

For preparing heptadecafluoroundecyloxyethanol, the following reagents are placed in a one gallon stirred autoclave: 2-(2-iodo-4,4,5,5,6,6,7,7,8,8,9,9,10,10,11,11,11-heptadecafluoro-undecyloxy)ethanol (292 g., 0.45 mole), potassium carbonate (69 g., 0.5 mole), 5 percent palladium on charcoal (30 g.), and absolute ethanol, 1,000 ml. The autoclave is filled with hydrogen at a pressure of 800 psi. The reaction is stirred for 21 hours at 60°. The catalyst is then removed by filtration, the solvent evaporated under reduced pressure and the residue taken up in ether. The ether solution is washed with water and dried over magnesium sulfate. The drying agent is removed by filtration and the solvent is removed from the filtrate by evaporation, leaving 217 g. (0.415 mole) of dark yellow liquid having $n_D^{25}$ 1.3435. The infrared spectrum showed neither the presence of a C-I bond nor unsaturation. The material was distilled on a spinning band column giving 171 g. (0.33 mole, 73 percent) of purified material with a boiling point of 134° C. at 8.4 mm. pressure.

The intermediate iodoether-alcohol was prepared as follows:

Perfluorooctyl iodide (224 g., 0.41 moles) was washed free of iodine with $Na_2SO_3$ or $NaHSO_3$ and added to a three-necked flask equipped with a thermometer, nitrogen inlet, condenser, stopper and bubbler. Freshly distilled allyloxyethanol (43 g., 0.42 mole) and ABN [azobis(isobutyronitrile)] (0.7 g., 0.004 mole) are then added. The flask and contents are heated to 85° at which point the mixture is clear and water-white. At 90° the reaction becomes exothermic. At 105° the evolution of heat becomes extremely rapid and the temperature rises quickly to about 149°. Stirring is continued and the reaction allowed to cool to 95°. Heating is resumed and the reaction maintained at this temperature for two hours. Addition of 0.34 g. (0.002 moles) of ABN at this point does not produce an exotherm. Heating was resumed for 2 hours and a like amount of ABN again added. After four more hours the reaction is stopped and the reaction mixture distilled to remove 81 g. of unreacted starting materials. The higher-boiling product remains behind as a clear yellow solid. Yield, 184 g. (70 percent).

Cotton cloth samples, when treated with the compound of this example, exhibited excellent soil resistance and oil and water repellency. Durability to laundering is good.

UTILITY OF THE COMPOSITIONS

The compositions of the invention are evaluated for their oil and water properties using the following test procedures:

| | |
|---|---|
| Water Repellency: | This is determined by the (spray test) AATCC (American Association of Textile Chemists and Colorists) - standard test method 22–1952. |
| Oil Repellency: | This is determined by the AATCC 118–1966T oil repellency test. |

What is claimed is:

1. A fabric finished with a compound of the formula $$[R_f(CH_2)_n(OR)_mOCH\ A]^+X^-$$

wherein $R_f$ is perfluoroalkyl of four to 16 carbon atoms, R is alkylene of two to three carbon atoms, X is halogen of the group chlorine or bromine, A is the residue of a tertiary nitrogeneous base selected from the group consisting of trialkyl amines wherein the alkyl radical contains from one to 12 carbon atoms, tricyclohexylamine, benzyldimethylamine, benzyldiethylamine, dibenzylethylamine, N,N-dimethylaniline, N,N-diethylaniline, N-methyl-N-ethylaniline, N,N-diisopropylaniline, pyridine, picoline and lutidine, $n$ is an integer of 1–12 and $m$ is an integer of 1–4.

* * * * *

UNITED STATES PATENT OFFICE
CERTIFICATE OF CORRECTION

Patent No. 3,734,687   Dated 5/22/73

Inventor(s) John Thomas Gresham

It is certified that error appears in the above-identified patent and that said Letters Patent are hereby corrected as shown below:

Page 1 and Column 1 in the title "QUARTERNIZED" should read --QUATERNIZED--.

Page 1, abstract, next to last line "quarternized" should read --quaternized--.

Column 3, line 13 "$[C_4F_9CH_2OCH_2...$" should read --$[C_4F_9CH_2CH_2OCH_2...$--.

Signed and sealed this 17th day of December 1974.

(SEAL)
Attest:

McCOY M. GIBSON JR.
Attesting Officer

C. MARSHALL DANN
Commissioner of Patents